United States Patent

Lee et al.

Patent Number: 5,349,828
Date of Patent: Sep. 27, 1994

[54] CONVEYOR BELT CLEANING APPARATUS FOR FOOD FREEZING

[75] Inventors: Ron C. Lee, Bloombury; Mark J. Kirschner, Morristown, both of N.J.

[73] Assignee: The BOC Group, Inc., New Providence, N.J.

[21] Appl. No.: 122,676

[22] Filed: Sep. 17, 1993

[51] Int. Cl.$^5$ ............................................... F28G 1/00
[52] U.S. Cl. ................................. 62/303; 62/374
[58] Field of Search ............... 62/63, 374, 380, 303, 62/57

[56] References Cited

U.S. PATENT DOCUMENTS

| | | | |
|---|---|---|---|
| 3,403,530 | 10/1968 | Guiffre | 62/303 |
| 3,477,242 | 11/1969 | Lamb et al. | 62/283 |
| 3,982,404 | 9/1976 | Overbye | 62/57 |
| 4,186,566 | 2/1980 | AuYoung | 62/380 |
| 4,243,136 | 1/1981 | Kaufman | 198/493 |
| 4,283,923 | 8/1981 | Gruda et al. | 62/303 |
| 4,350,027 | 9/1982 | Tyree, Jr. | 62/374 |
| 4,399,660 | 8/1983 | Vogler, Jr. et al. | 62/50.2 |
| 4,481,782 | 11/1984 | Mukerjee | 62/63 |
| 4,539,824 | 9/1985 | Kuraoka et al. | 62/380 |
| 5,025,632 | 6/1991 | Spritzer | 62/303 |

*Primary Examiner*—Ronald C. Capossela
*Attorney, Agent, or Firm*—David M. Rosenblum; Larry R. Cassett

[57] ABSTRACT

A freezer having a freezing compartment and a porous conveyor belt for conveying articles through the freezing compartment. A vaporizer is provided to vaporize a stream of liquid cryogen. Vaporized cryogen is directed against the belt as a plurality of jets to blow accumulated ice off the belt. The vaporizer is located within the freezing compartment so that the cooling potential of the cryogen is not wasted and the vaporizer can serve as a preferential condensation site for the moisture.

6 Claims, 1 Drawing Sheet

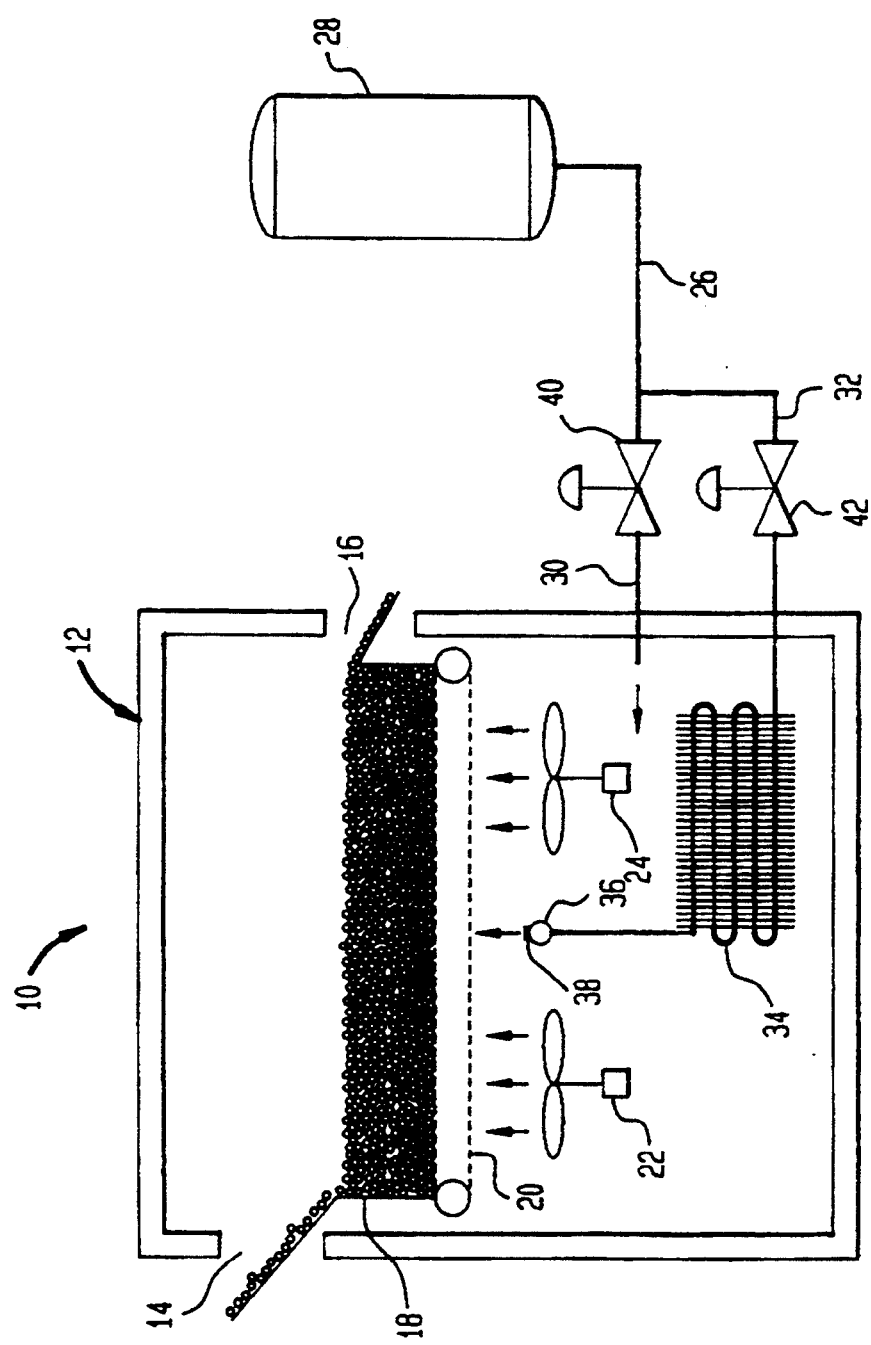

CONVEYOR BELT CLEANING APPARATUS FOR FOOD FREEZING

BACKGROUND OF THE INVENTION

The present invention relates to a freezer in which articles to be refrigerated pass through the freezer on a porous belt. More particularly, the present invention relates to a cryogenic freezer in which the articles are refrigerated by nitrogen vapor being circulated through the belt and within the freezer. Even more particularly, the present invention relates to such a cryogenic freezer in which a bed of the article to be frozen is fluidized on the belt.

Industrial freezers incorporate a porous belt on which articles to be refrigerated are conducted through a freezing compartment from an inlet to an outlet of the freezing compartment. Various means are provided to produce refrigeration within the freezing compartment including the use of liquid and gaseous cryogens formed from liquefied carbon dioxide and nitrogen. The refrigeration is typically provided for cryogenic freezers by spraying a liquid cryogen into the freezing compartment through spray nozzles. Cryogenic vapor produced through the introduction of the liquid cryogen into the freezing compartment is circulated to refrigerate the articles. In a fluidized bed freezer, the cryogenic vapor is circulated with a sufficient velocity to fluidize a bed of articles to be frozen, passing through the freezer on the porous belt.

In prior art cryogenic freezers, some air enters the freezing compartment along with the articles to be frozen. The air contains moisture and such moisture freezes and accumulates on the belt as ice. Very often, food is frozen that has significant amount of moisture on its surface. Moisture released from the food will also enter the freezing compartment to accumulate on the belt as ice. In a fluidized bed freezer this is particularly troublesome in that the belt loses its porosity and therefore, the freezer loses its effectiveness.

Prior art methods for cleaning ice from the belt have included wire brushes to scrape off the ice and muting the belt outside of the freezer where a forced flow of ambient air is used to defrost the belt. These methods suffer from being either unreliable, overly complex, and/or thermally inefficient. Another method of belt cleaning in cryogenic freezers has been the introduction of externally vaporized cryogen into the freezer in the form of gas jets directed toward the belt. This method, however, is wasteful of the cryogen because the energy added to vaporize the cryogen represents wasted cooling potential.

As will be discussed, the present invention provides a cryogenic freezer of less complexity than the prior art and which conserves the cooling potential of the cryogen being used to freeze the articles.

SUMMARY OF THE INVENTION

The present invention provides a freezer comprising a freezing compartment having an inlet through which articles to be refrigerated enter the freezing compartment and an outlet through which the articles are discharged from the freezing compartment after having been refrigerated. It is to be noted that the term "refrigerated" can mean that the articles are frozen or merely cooled. A porous conveyor belt is provided for conveying the articles through the freezing compartment, from the inlet to the outlet. The porous conveyor belt accumulates ice during operation of the freezer. A liquid cryogen conduit means is configured to be connected to a source of liquid cryogen for conveying a stream of the liquid cryogen into the freezing chamber. A vaporizer is located within the freezing chamber and in communication with the liquid cryogen conduit means for vaporizing the stream of the liquid cryogen to form cryogenic vapor. The warmed cryogenic vapor at temperature up to the freezer operating temperature (typically $-60°$ C.) has significantly greater energy potential for belt cleaning than the liquid cryogen. A means is provided for directing jets of the cryogenic vapor against the porous belt to clear the ice accumulated on the porous belt. It is to be further noted that the term, "cryogen" means any highly volatile fluid that by and large exists as a vapor at atmospheric temperatures and pressures, preferably though, atmospheric gases such as nitrogen.

Since liquid cryogen is evaporated within the freezing compartment, the cooling potential of the liquid cryogen is not lost. Additionally, since the present invention does not use external defrosting of the belt, a cryogenic freezer constructed in accordance with the present invention does not have the complexity of cryogenic freezers of the prior art that employ external defrosting of freezer belts.

BRIEF DESCRIPTION OF THE DRAWING

While the specification concludes with claims distinctly pointing out the subject matter that Applicants regard as their invention, it is believed that the invention will be better understood from the accompanying sole figure which is a schematic of a cryogenic freezer in accordance with the present invention.

DETAILED DESCRIPTION

With reference to the sole figure, the present invention can be used in connection with a fluidized bed freezer 10 of known design. Fluidized bed freezer 10 consists of a freezing compartment 12 having an inlet 14 and an outlet 16. Articles 18 to be refrigerated enter inlet 14 of freezing compartment 12 and are discharged from outlet 16 of freezing compartment 12. It should be noted that the present invention can be applied to other cryogenic freezers in which a liquid cryogen is sprayed into a freezing compartment as well as mechanical freezers which do not depend on a cryogen to supply refrigeration.

In fluidized bed freezer 10, a porous conveyor belt 20 carries articles 18 through freezing compartment 12 from inlet 14 to outlet 16 thereof. Positioned below porous conveyor belt 20, are circulation fans 22 and 24 of well known design to circulate the atmosphere within freezing compartment 12 and to fluidize the bed of articles 18. In order to freeze articles 18 during such fluidization, a liquid nitrogen conduit 26 supplies liquid nitrogen from storage tank 28 to freezing compartment 12 through a primary branch 30 of conduit 26. Upon entering freezing compartment 12, the liquid nitrogen vaporizes and the evolved nitrogen vapor is circulated within freezing compartment 12 by fans 22 and 24.

In addition to articles 18, air from the environment surrounding fluidized bed freezer 10 is, unavoidably, continually being drawn into the freezing compartment 12. Airborne moisture present within the circulated air freezes and in prior art cryogenic freezers, collects on the belt transporting the articles through the freezer. Also, as discussed above, moisture from food being frozen can freeze to collect on the belt. In accordance with the subject invention, a subsidiary branch line 32 is provided to conduct a subsidiary stream through a vaporizer 34 which can be a finned vaporizer tube. The length and size of the tube are determined in a known manner based upon the flow rate of nitrogen to be fully vaporized. Since the freezing compartment is typically at −60° C. and the liquid nitrogen is near −180° C., the liquid nitrogen will vaporize within vaporizer 34, and warmed to nearly the freezing compartment temperature. As can be appreciated although the illustrated embodiment uses nitrogen, it is possible to utilize the present invention with freezers utilizing other cryogens, provided of come there exists a sufficient temperature differential between the interior of the freezing chamber of such freezers and the cryogen in its liquid state.

Attached to vaporizer 34 is a header 36 having a width of approximately the same as conveyor belt 20. Header 36 is provided with known blow-off nozzles 38 to direct jets of nitrogen vapor against the belt. These jets are of a sufficient velocity to blow any accumulated ice off the belts. As can be appreciate{the number of blow-off nozzles will vary in dependence on the width of the belt. Additionally, vaporizer 34 being located within freezing compartment 12 and in the circulation path of the atmosphere of freezing compartment 12, will provide surfaces on which moisture preferentially freezes to help prevent accumulation of ice on the belt in the first instance.

It is possible to rome the vaporized cryogen outside of the freezer for further warming in an external heat exchanger. The warmed gas would have more energy available for ice removal, but would represent an incremental heat load to the freezer.

In order to control cryogenic freezer 10, two valves 40 and 42 are provided. Suitable adjustment of valves 40 and 42 control the total amount of refrigeration provided versus the amount of nitrogen being used to blow off belt 20. Valve 40 is operated in response to the temperature within the freezer, while valve 42 is normally fully open during the operation of the freezer.

While the invention has been illustrated in relation to a preferred embodiment, it will be understood by those skilled in the art that numerous additions, omission and changes may be made without departing from the spirit and scope of the invention.

We claim:

1. In a freezer comprising: a freezing compartment having an inlet through which articles to be refrigerated enter the freezing compartment, the refrigeration supplied by a liquid cryogen and the articles refrigerated at a temperature higher than that of the liquid cryogen prior to entry of the liquid cryogen to the freezing compartment and an outlet through which the articles are discharged from the freezing compartment after having been refrigerated; and a porous conveyor belt for conveying the articles through the freezing compartment, from the inlet to the outlet, the porous conveyor belt accumulating ice during operation of the freezer; the improvement comprising:

liquid cryogen conduit means configured to be connected to a source of the liquid cryogen for conveying a stream of the liquid cryogen into the freezing chamber;

a vaporizer located within the freezing chamber and in communication with the liquid cryogen conduit means for vaporizing the stream of the liquid cryogen to form cryogenic vapor while said freezer is in use; and means for forming and for directing jets of the cryogenic vapor against the porous belt to clear ice accumulated on the porous belt.

2. The improvement of claim 1 in which the vaporizer comprises finned vaporizer tubing.

3. The improvement of claim 1 in which the jet directing means comprises a header pipe connected to the vaporizer and blow-off nozzles connected to the header pipe so as to underlie the porous conveyor belt.

4. The improvement of claim 1, wherein: the freezer is a fluidized bed freezer; the cryogen comprises nitrogen; the freezer has liquid nitrogen introduction means located within the freeing compartment for introducing liquid nitrogen into the freezing compartment to refrigerate the articles, the liquid cryogen conduit means comprises a branched conduit having a primary branch connected to the liquid nitrogen introduction means and a subsidiary branch connected to the vaporizer; and the jet forming and directing means is located beneath the conveyor belt.

5. The improvement of claim 4 in which the vaporizer comprises finned vaporizer tubing.

6. The improvement of claim 5 in which the jet directing means comprises a header pipe connected to the vaporizer and blow-off nozzles connected to the header.

* * * * *